Nov. 28, 1933. A. GEBHERT 1,936,786
AIRCRAFT WINGS
Filed April 17, 1931
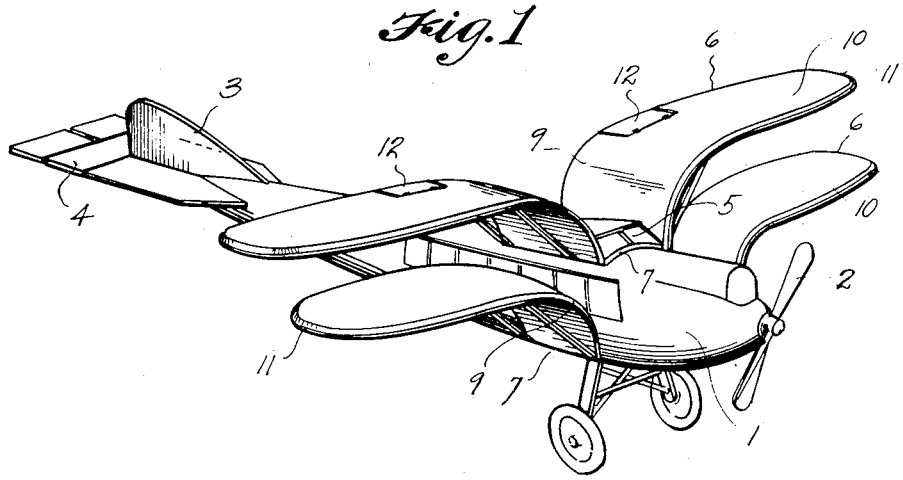
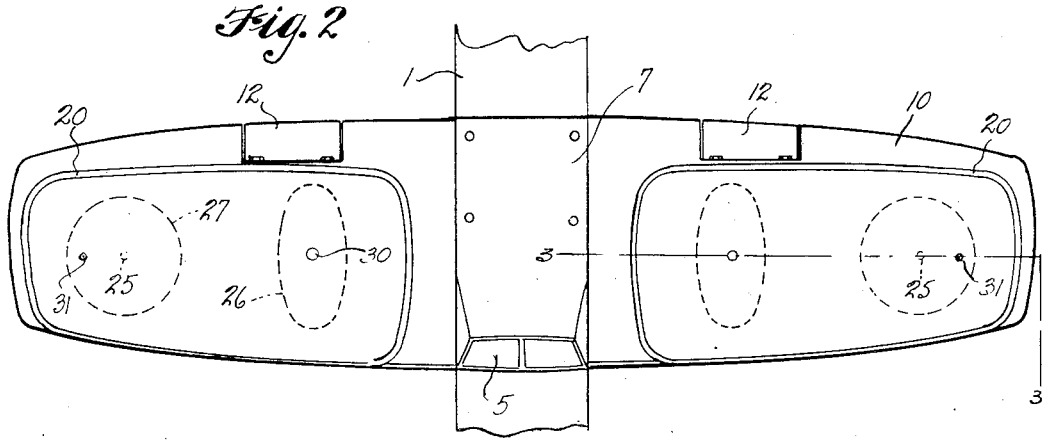
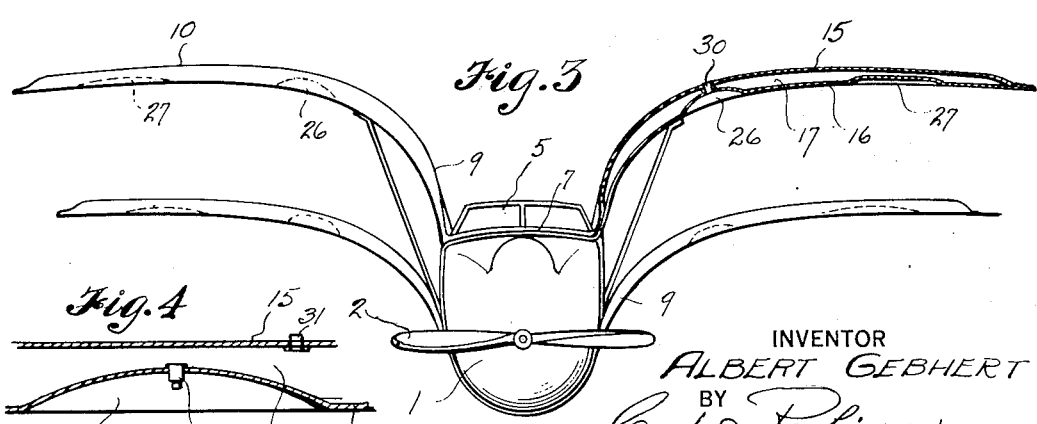
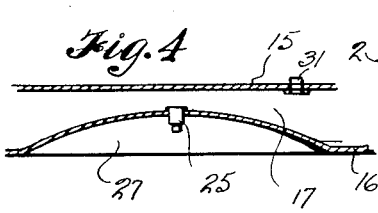
INVENTOR
ALBERT GEBHERT
BY
Cook & Robinson
ATTORNEY Patented Nov. 28, 1933

1,936,786

UNITED STATES PATENT OFFICE 1,936,786

AIRCRAFT WINGS

Albert Gebhert, Seattle, Wash.

Application April 17, 1931. Serial No. 530,815

1 Claim. (Cl. 244—5)

This invention relates to improvements in airplane construction, and it has reference more particularly to the details of construction of wings, or airfoils, for airplanes of the land or water types of construction; it being the principal object of the invention to provide a wing of novel construction adapted to contain a lifting gas as an aid in sustaining the ship in flight and to render control of the plane in flight easier.

It is also an object of the invention to provide a paired wing construction in which the individual wings bend upwardly, then outwardly in opposite directions at opposite sides of the plane so as to sort of suspend the plane between them, thereby insuring a better balance, whereby easier control is assured.

It is also an object to provide the under sides of the wings with upwardly depressed pockets especially useful in retarding drop or downward flight as in landing, and to provide outlets from said pockets, through to the upper surface of the wings which may be opened for the escape of pocketed air when it is desired to accelerate the drop of the plane.

Other objects of the invention reside in the details of construction of the various parts of the wing, in their combination and use as will hereinafter be fully described.

In accomplishing these and other objects, I have provided the improved details of construction, the preferred forms of which are illustrated in the accompanying drawing, wherein—

Fig. 1 is a perspective view of an airplane equipped with wings constructed in accordance with the present invention.

Fig. 2 is a plan view of the wings.

Fig. 3 is a front view, one wing being in section, as in line 3—3 in Fig. 2, to illustrate the hollow construction and pockets.

Fig. 4 is a sectional detail.

Referring more in detail to the several views of the drawing—

1 designates the fuselage of an airplane which may be of any of the usual types for land or water flying, and which may be equipped with any suitable engine for driving the propeller 2 at the nose or front end of the plane. At the rear end of the fuselage are rudders 3 and elevators 4 for controlling the plane in flight, and these may be of the generally adopted types, or of any special construction. The fuselage may have the usual compartment, as at 5, for the pilot, or it may be otherwise equipped, this being an immaterial part of the present invention.

The present invention relates principally to the construction of the wings of the plane which are designated by reference character 6. I have shown the plane as being of a biplane type, but it is to be understood that it may be either of this construction or of the character of a monoplane, the wing construction being practically the same in either instance.

In a preferred form the wings of each pair are symmetrically arranged relative to the plane, and are attached at their inner ends to a central frame structure 7 which is bolted or otherwise attached to the fuselage. The frame for the upper wings overlies the top of the fuselage and that for the lower pair of wings underlies it, as in Fig. 3. The wings, from the point of attachment to the frame 7, extend upwardly as at 9, then curve gradually and evenly outward providing a substantially horizontal portion 10 of a length sufficient for the particular plane. The longitudinal edges of the wings from the fuselage outwardly, are curved slightly toward each other, as in Fig. 2, so that at the outer end the wing is relatively narrow. Also, the ends of the wings are rounded outwardly as at 11.

Ailerons 12—12 are hingedly mounted in recesses in the rear edges of the wings, and these would be operatively connected in the usual manner for controlling their movement from the pilot's position.

Each wing is of hollow construction by reason of spacing an air tight top wall forming surface 15 away from the lower wall forming surface 16 providing an intermediate space 17 for containing a gas under pressure which gas would be of a character to aid in sustaining or lifting the plane.

In the construction illustrated, these gas spaces extend practically over the entire areas of the wings. It is preferred, in forming the wing to first provide a suitable frame, then to apply the lower wall of sheet metal, then to apply the upper wall which also may be of sheet metal soldered or welded about its edges to the lower wall, or which may consist of a sheet of a material such as rubber bound or clamped about its edges beneath a metal binding strip 20 which in turn is welded or soldered to the under wall. It is to be understood that the specific details of construction may be varied in accordance with the different sizes of wings, or in accordance with a particular use for the plane. For filling or inflating the wing spaces 17 with a gas, I have provided valves 25 in the under side walls, to which a hose or the like may be attached to deliver the gas to the wing.

Another feature of the invention resides in the provision of air pockets as at 26 and 27 in the under sides of the wings. These pockets are formed by pressing the wall upwardly into the gas space, as shown in Fig. 3, to an extent sufficient that the pockets will be materially effective in catching and holding the air. The pocket 26, closest to the fuselage, is of oblong shape and extends in a direction lengthwise of the plane, while the pocket 27 is circular and is located near the outer end of the wing. An opening 30 is provided through the bottom of the pocket 26 up through the wing for an outlet or outflow of pocketed air and this will prevent the pocketed air from having a retarding influence especially in rapid descent of the plane.

Wings of this character are especially desirable for gliding, either in motor driven or motorless planes. The wing adds materially to the safety and stability of the plane in flight and by reason of its buoyancy requires less power to propel the plane and makes possible flying at low speed. It is intended also to provide the gas chamber of each wing with a relief valve 31 which can be opened when this is desired to discharge gas from the chamber, either to avoid over pressure or to decrease the buoyancy.

In flying, the effect of the position of the fuselage below the level of the wings by reason of the downward curvature of the inner end portions, is to add to the stability of the plane, overcoming lateral tilting and making it easier to maintain the plane in an even flight. A better balance is insured and it is difficult to fly otherwise than in proper horizontal position.

It is to be understood that the minor details of construction might be altered without departing from the spirit of the invention, and for this reason I do not wish the claim to be limited only to details shown, but to be given an interpretation commensurate with the scope of the invention.

Having thus described my invention, what I claim as new therein, and desire to secure by Letters Patent is—

In an airplane, or the like, a pair of supporting wings having attaching means whereby they are held in a direction laterally of the plane, said wings being extended upwardly from the body of the plane, then curved gradually outward to a substantially horizontal position, said wings having spaced apart upper and lower wall surfaces, an intermediate gas enclosing chamber, the under walls of the wings being formed with upwardly depressed air pockets, an inflating valve in one of the pockets of each wing, and an opening leading from the base of the other pocket upwardly through the wing.

ALBERT GEBHERT.